United States Patent
Ho et al.

(10) Patent No.: US 12,222,610 B1
(45) Date of Patent: Feb. 11, 2025

(54) DISPLAY PANEL

(71) Applicant: HANNSTAR DISPLAY CORPORATION, Taipei (TW)

(72) Inventors: Min-Jung Ho, Tainan (TW); Hsien-Tang Hu, Taichung (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 18/641,424

(22) Filed: Apr. 21, 2024

(30) Foreign Application Priority Data

Oct. 11, 2023 (TW) .................. 112138659

(51) Int. Cl.
  *G02F 1/1343* (2006.01)
  *G02F 1/1335* (2006.01)
  *G02F 1/1362* (2006.01)
  *G02F 1/1365* (2006.01)

(52) U.S. Cl.
  CPC .... *G02F 1/13439* (2013.01); *G02F 1/133553* (2013.01); *G02F 1/1365* (2013.01); *G02F 1/136227* (2013.01)

(58) Field of Classification Search
  None
  See application file for complete search history.

(56) References Cited

U.S. PATENT DOCUMENTS

| | | | | |
|---|---|---|---|---|
| 6,195,140 B1 * | 2/2001 | Kubo | ................. | G02F 1/13439 349/44 |
| 6,452,654 B2 * | 9/2002 | Kubo | ................. | G02F 1/13439 349/44 |
| 2003/0016322 A1 * | 1/2003 | Ha | ................. | G02F 1/133555 349/113 |
| 2004/0189905 A1 * | 9/2004 | Oda | ................. | G02F 1/136209 349/114 |
| 2007/0195241 A1 | 8/2007 | Lim | | |
| 2007/0242196 A1 * | 10/2007 | Yoshida | ............ | G02F 1/133512 349/114 |
| 2008/0062361 A1 | 3/2008 | Jang | | |
| 2010/0296035 A1 | 11/2010 | Kim | | |

(Continued)

FOREIGN PATENT DOCUMENTS

| | | |
|---|---|---|
| CN | 116449612 A | 7/2023 |
| KR | 10-2004-0012445 A | 2/2004 |

(Continued)

*Primary Examiner* — Ryan Crockett
(74) *Attorney, Agent, or Firm* — Winston Hsu

(57) ABSTRACT

This invention discloses a display panel including a sub-pixel. The sub-pixel includes a switch device, a first electrode, a transparent electrode, and a reflective electrode. The switch device and the first electrode are disposed in the reflective region and electrically connected. The transparent electrode is disposed on the first electrode and in the reflective region and the light transmissive region. The transparent electrode has a first length in a first direction and a second length in a second direction. The reflective electrode is disposed on the transparent electrode and in the reflective region. The reflective electrode has a third length in the first direction and a fourth length in the second direction, and the third length is greater than the first length, and the fourth length is greater than the second length. The transparent electrode, the reflective electrode, and the first electrode are electrically connected.

10 Claims, 4 Drawing Sheets

(56) References Cited

U.S. PATENT DOCUMENTS

| | | | |
|---|---|---|---|
| 2014/0071365 A1* | 3/2014 | Song | G02F 1/134363 |
| | | | 349/43 |
| 2016/0077378 A1* | 3/2016 | Choi | H01L 27/12 |
| | | | 438/30 |

FOREIGN PATENT DOCUMENTS

| | | |
|---|---|---|
| TW | 200622392 | 7/2006 |
| TW | 201020625 A1 | 6/2010 |

* cited by examiner

DISPLAY PANEL

BACKGROUND OF THE INVENTION

1. Field of the Invention

The present invention relates to a display panel, and more particularly, to a transflective display panel.

2. Description of the Prior Art

Among different types of display panels, the transflective display panel has the advantage of low power consumption because it utilizes ambient light as a part of the light source to achieve the display effect. At present, many electronic products, such as writing pads, electronic papers, tablet PCs, notebook computers, etc., use transflective display panels. In the present invention, improving the display quality of the transflective display panels is one of the purposes.

SUMMARY OF THE INVENTION

This invention aims to provide a display panel for solving the technical problem of how to improve the display quality of a transflective display panel.

In order to solve the above technical problems, the present invention provides a display panel including a substrate and a sub-pixel. The sub-pixel is disposed on the substrate. The sub-pixel includes a reflective region and a light transmissive region, and the light transmissive region is disposed in the reflective region. The sub-pixel further includes a switch device, a first electrode, a transparent electrode, and a reflective electrode. The switch device is disposed in the reflective region. The first electrode is disposed in the reflective region and electrically connected to a drain of the switch device. The transparent electrode is disposed on the first electrode and in the reflective region and the light transmissive region, and the transparent electrode is electrically connected to the first electrode. The transparent electrode has a first length in a first direction and a second length in a second direction, and the first direction and the second direction are different. The reflective electrode is disposed on the transparent electrode and in the reflective region, and the reflective electrode is electrically connected to the transparent electrode. The reflective electrode has a third length in the first direction and a fourth length in the second direction, and the third length is greater than the first length and the fourth length is greater than the second length. The reflective electrode includes an opening, and the opening is corresponded to the light transmissive region of the sub-pixel.

In the display panel of the present invention, the size of the reflective electrode can be greater than the size of the transparent electrode, and at least part of the edges of the transparent electrode can be covered by the reflective electrode. Therefore, the phenomenon that the silver of the reflective electrode remains at the edges of the transparent electrode can be reduced, and the image quality of the display panel can be improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
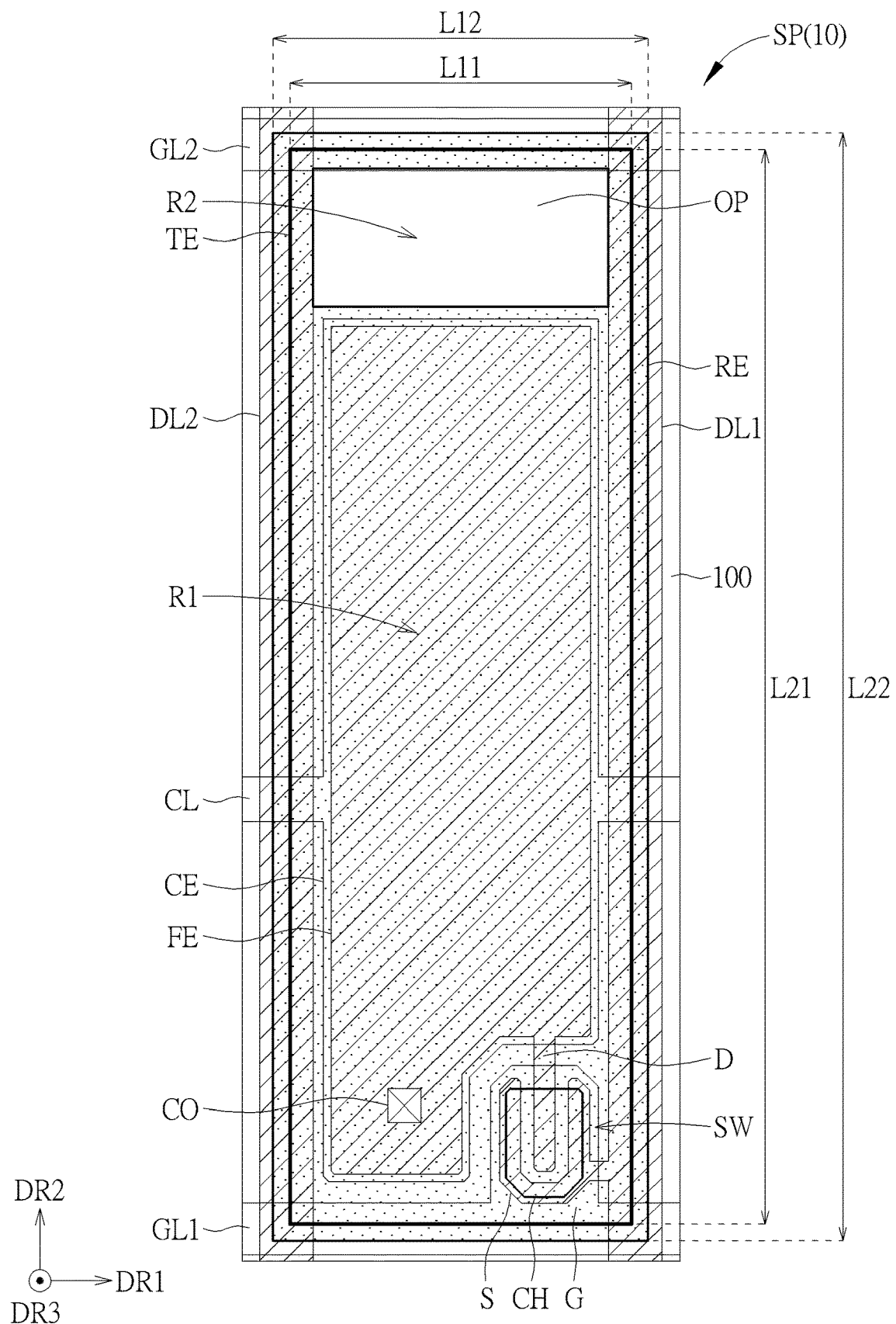
FIG. 1 is a schematic diagram illustrating a top view of a pixel structure in a display panel according to a first embodiment of the present invention.

To provide a better understanding of the present invention to those skilled in this field, preferred embodiments will be detailed as follows. The preferred embodiments of the present invention are illustrated in the accompanying drawings to elaborate on the contents and effects to be achieved. It should be noted that the drawings are simplified schematics, and therefore show only the components and combinations associated with the present invention, to provide a clearer description of the basic architecture or method of implementation. The components would be complex in reality. In addition, for ease of explanation, the components shown in the drawings may not represent their actual number, shape, and dimensions; details can be adjusted according to design requirements.

Figure 2:
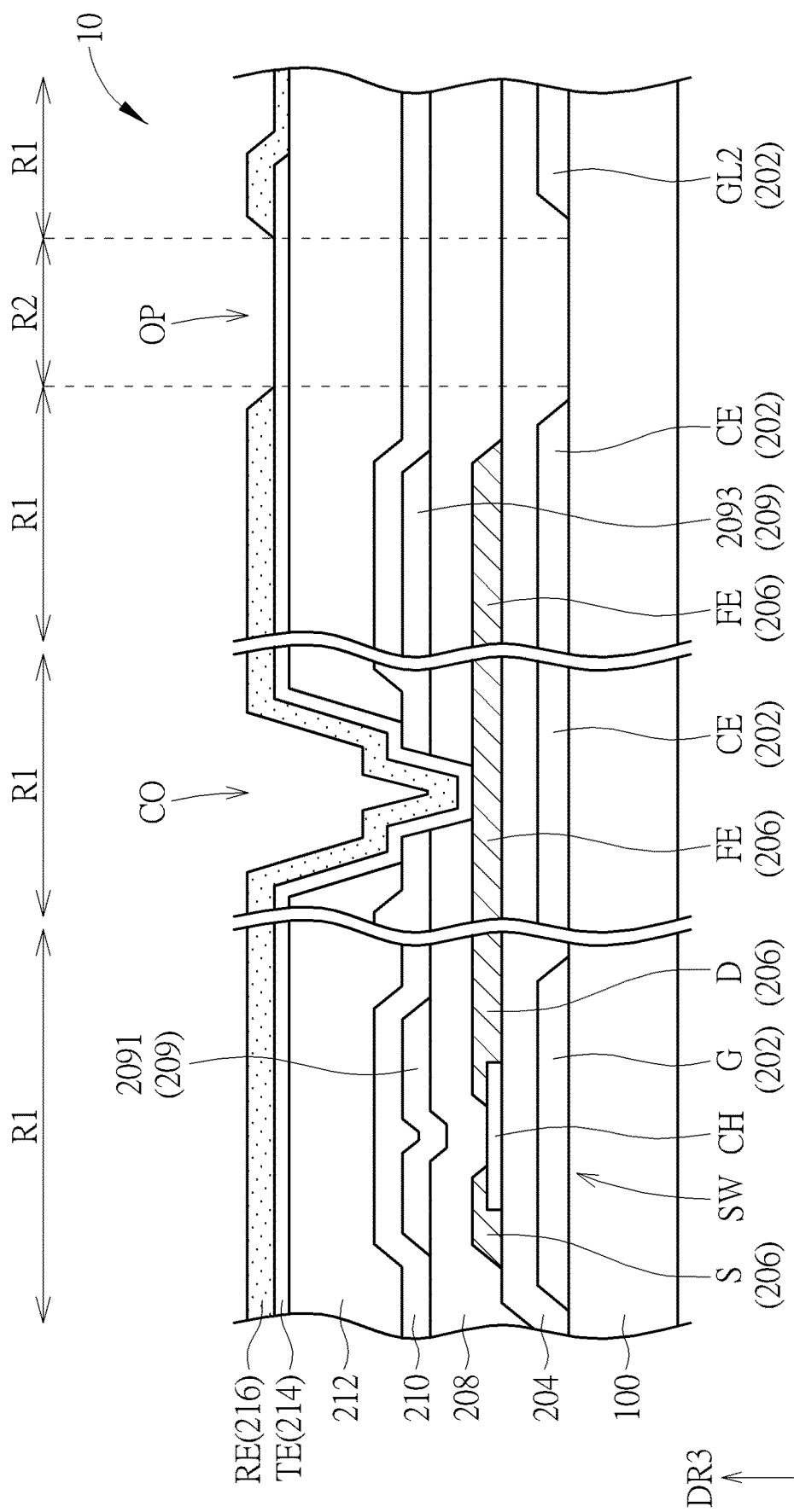
FIG. 2 is a schematic diagram illustrating a cross-sectional view of the display panel according to the first embodiment of the present invention.

A direction DR1, a direction DR2, and a direction DR3 are shown in the following drawings. The direction DR3 may be the normal direction or the top view direction. As shown in FIG. 2, the direction DR3 may be perpendicular to a top surface of a substrate 100. As shown in FIG. 1, the direction DR1 and the direction DR2 may be horizontal directions and perpendicular to the direction DR3. The direction DR1 and the direction DR2 are different, for example, the direction DR1 may be perpendicular to the direction DR2. The spatial relationship of the structure can be described according to the directions DR1, DR2, and DR3 in the following drawings.

Referring to FIG. 1 and FIG. 2, FIG. 1 is a schematic diagram illustrating a top view of a pixel structure in a display panel according to a first embodiment of the present invention, and FIG. 2 is a schematic diagram illustrating a cross-sectional view of the display panel according to the first embodiment of the present invention. The display panel of this embodiment takes a transflective liquid crystal panel as an example, but the present invention is not limited to this. As shown in FIG. 1, the display panel 10 includes the substrate 100, a plurality of scan lines (such as scan lines GL1 and GL2), and a plurality of data lines (such as data lines DL1 and DL2). The scan lines and the data lines are disposed on the substrate 100. The substrate 100 may include a rigid substrate such as a glass substrate, a plastic substrate, a quartz substrate, or a sapphire substrate, but not limited thereto. The substrate 100 may also include a flexible substrate such as a polyimide (PI) substrate or a polyethylene terephthalate (PET) substrate, but not limited thereto.

The scan lines GL1 and GL2 are disposed along the direction DR2 and extend in the direction DR1, and the data lines DL1 and DL2 are disposed along the direction DR1 and extend in the direction DR2. The scan lines can cross the data lines to form at least one sub-pixel SP, and the display panel 10 includes at least one sub-pixel SP disposed on the substrate 100.

In some embodiments (as shown in FIG. 1), the sub-pixel SP includes a reflective region R1 and a light transmissive region R2, and the light transmissive region R2 can be disposed in the reflective region R1. Specifically, the reflective region R1 and the light transmissive region R2 do not overlap, and the light transmissive region R2 may be surrounded by the reflective region R1. In the present invention, the material that can reflect light (such as metal) is disposed in the reflective region R1. The material that can block light is not disposed in the light-transmitting region R2, but the transparent material (such as the transparent conductive material) can be disposed in the light transmissive region R2.

The sub-pixel SP further includes a switch device SW, and the switch device SW is disposed on the substrate 100 and in the reflective region R1 of the sub-pixel SP. The switch device can include a thin film transistor, and the thin film transistor may be, for example, a bottom-gate thin film transistor, but not limited thereto. In other embodiments, the thin film transistor may also be a top-gate thin film transistor. In addition, the thin film transistor may also be a low temperature poly-silicon (LTPS) thin film transistor, an indium gallium zinc oxide (IGZO) thin film transistor, or an amorphous silicon (a-Si) thin film transistor, but not limited thereto.

Thin film transistor includes a gate G, a source S, a drain D, and a semiconductor layer CH. The scan line GL1 is electrically connected to the gate G of the switch device SW, and a switch signal that can control the thin film transistor can be provided to the gate G of the switch device SW through the scan line GL1, thereby controlling the display panel 10 to update the image. The data line DL1 is electrically connected to the source S of the switch device SW, and an image gray-scale signal can be provided to the source S of the switch device SW through the data line DL1.

The sub-pixel SP includes a first electrode FE, and the first electrode FE is disposed in the reflective region R1 of the sub-pixel SP. As shown in FIG. 1, the first electrode FE can be disposed on one side of the switch device SW, and the first electrode FE is electrically connected to the drain D of the switch device SW.

In addition, the first electrode FE may have a first side and a second side opposite to the first side, the switch device SW may be disposed on the first side of the first electrode FE (as shown in the lower right side of the first electrode FE in FIG. 1), and the light transmissive region R2 of the sub-pixel SP may be disposed on the second side of the first electrode FE (as shown in the upper side the first electrode FE in FIG. 1), but not limited thereto.

The sub-pixel SP includes a second electrode CE, and the second electrode CE is disposed between the first electrode FE and the substrate 100. The display panel 10 includes a common signal line CL extending in the direction DR1 and disposed between the scan line GL1 and the scan line GL2 in the direction DR2. The second electrode CE is electrically connected to the common signal line CL, and the common signal line CL can provide a common voltage to the second electrode CE.

The sub-pixel SP includes a transparent electrode TE (represented by a thick black line), and the transparent electrode TE is disposed on the first electrode FE and in the reflective region R1 and the light transmissive region R2 of the sub-pixel SP. The transparent electrode TE is electrically connected to the first electrode FE. For example, the transparent electrode TE can be electrically connected to the first electrode FE through a contact hole CO. The transparent electrode TE has a length L11 in the direction DR1 and a length L21 in the direction DR2. For example, one side (e.g., short side) of the transparent electrode TE has the length L11 in the direction DR1, and another side (e.g., long side) of the transparent electrode TE has the length L21 in the direction DR2. The length L21 is greater than the length L11, but not limited thereto. The area of the transparent electrode TE is greater than the area of the first electrode FE, but not limited thereto.

The sub-pixel SP includes a reflective electrode RE (represented by dots) disposed on the transparent electrode TE, and the reflective electrode RE is electrically connected to the transparent electrode TE. For example, the reflective electrode RE is partially overlapped with the transparent electrode TE, and the reflective electrode RE can be directly contacted to the transparent electrode TE. The reflective electrode RE, the transparent electrode TE, and the first electrode FE are electrically connected to each other and can together be electrically connected to the drain D of the switch device SW. Therefore, the reflective electrode RE, the transparent electrode TE, and the first electrode FE together can be served as a pixel electrode.

The reflective electrode RE has a length L12 in the direction DR1 and a length L22 in the direction DR2. For example, one side (e.g., short side) of the reflective electrode RE has a length L12 in the direction DR1, and another side (e.g., long side) of the reflective electrode RE has a length L22 in the direction DR2. The length L22 is greater than the length L12, but not limited thereto.

In this embodiment, the length L12 of the reflective electrode RE is greater than the length L11 of the transparent electrode TE, and the length L22 of the reflective electrode RE is greater than the length L21 of the transparent electrode TE. The area of the reflective electrode RE (the area of the region surrounded by four sides, and the area of the opening inside is also included) is greater than the area of the transparent electrode TE. As shown in FIG. 1, four edges of the transparent electrode TE are covered by the reflective electrode RE. More specifically, as shown in FIG. 2, the side surface of the edge of the transparent electrode TE is also covered by the reflective electrode RE.

When the edge of the transparent electrode TE and the edge of the reflective electrode RE are aligned in the direction DR3 (such as when the length of the reflective electrode RE is equal to the length of the transparent electrode TE), or when the edge of the reflective electrode RE is located inside the edge of the transparent electrode TE (such as when the length of the reflective electrode RE is less than the length of the transparent electrode TE), the silver from the reflective electrode RE will remain at the edges of the transparent electrode TE, causing the image quality of the display panel 10 poor.

However, in this embodiment, the lengths of four sides of the reflective electrode RE are greater than the lengths of four sides of the transparent electrode TE, and four edges of the transparent electrode TE are covered by the reflective electrode RE. This design can reduce the phenomenon that the silver of the reflective electrode RE remains at the edges of transparent electrode TE, thereby further improving the image quality of the display panel 10.

In this embodiment, the reflective electrode RE includes an opening OP, and the position of the opening OP is corresponded to the light transmissive region R2 of the sub-pixel SP. As shown in FIG. 1, the opening OP may be disposed between the scan line GL2 and the second electrode CE in the direction DR2 and between the data line DL1 and the data line DL2 in the direction DR1, but not limited thereto. In this embodiment, the transparent electrode TE can extend into the light transmissive region R2 of the sub-pixel SP, whereas the reflective electrode RE is only disposed in the reflective region R1 of the sub-pixel SP and does not extend into the light transmissive region R2 of the sub-pixel SP. Therefore, as shown in FIG. 2, the opening OP of the reflective electrode RE overlaps a portion of the transparent electrode TE in the direction DR3, and the portion of the transparent electrode TE is exposed by the opening OP of the reflective electrode RE.

Since there is no opaque element disposed in the light transmissive region R2 of the sub-pixel SP, light from the backlight can pass through the light transmissive region and increase the brightness of the display panel 10. In addition, the ambient light can be reflected by the reflective electrode RE or other metal elements in the reflective region R1 to increase the brightness of the display panel 10. Therefore, the image quality of the display panel 10 can be improved.

In addition, as shown in FIG. 2, the display panel 10 includes a conductive layer 202, a gate insulating layer 204, a conductive layer 206, an insulating layer 208, a conductive layer 209, an insulating layer 210, an insulating layer 212, a transparent conductive layer 214, and a conductive layer 216 disposed on the substrate 100. In some embodiments, the display panel 10 may not include the conductive layer 209.

The conductive layer 202 may include the scan line GL1, the scan line GL2, the gate G of the switch device SW, the second electrode CE, and the common signal line CL in FIG. 1, but not limited thereto. The gate insulating layer 204 is disposed on the conductive layer 202. The conductive layer 206 and the semiconductor layer CH are disposed on the gate insulating layer 204. The conductive layer 206 (represented by diagonal lines) may include the data line DL1, the data line DL2, the source S and the drain D of the switch device SW, and the first electrode FE in FIG. 1, but not limited thereto.

The insulating layer 208, the conductive layer 209, the insulating layer 210, and the insulating layer 212 are sequentially disposed on the conductive layer 206 and/or the gate insulating layer 204. The gate insulating layer 204 and the insulating layers 208, 210 and 212 may include inorganic or organic insulating materials, but not limited thereto. The conductive layer 209 can be disposed between the insulating layer 208 and the insulating layer 210, and the conductive layer 209 may include an electrode 2091 and an electrode 2093, but not limited thereto. The electrode 2091 may be disposed on the switch device SW and may be overlapped with the semiconductor layer CH. The electrode 2093 may be disposed on the first electrode FE and may receive a common voltage.

In the display panel 10 of the present invention, at least one insulating layer is disposed between the first electrode FE and the transparent electrode TE, a contact hole CO is disposed in the at least one insulating layer, and the transparent electrode TE is electrically connected to the first electrode FE through the contact hole CO. As shown in FIG. 2, the insulating layer 208, the insulating layer 210, and the insulating layer 212 are disposed between the first electrode FE and the transparent electrode TE, and the contact hole CO can be disposed in the insulating layer 208, the insulating layer 210, and the insulating layer 212. The contact hole CO penetrates through the insulating layers 208, 210, and 212 and exposes a portion of the first electrode FE.

The transparent conductive layer 214 is disposed on the insulating layer 212 and includes a transparent electrode TE, but not limited thereto. As shown in FIG. 2, the transparent electrode TE can extend into the contact hole CO and contact with the first electrode FE, thus the transparent electrode TE can be electrically connected to the first electrode FE. The transparent conductive layer 214 may include a transparent conductive material, such as indium tin oxide (ITO), indium zinc oxide (IZO), or aluminum zinc oxide (AZO), but not limited thereto.

The conductive layer 216 is disposed on the transparent conductive layer 214 and includes the reflective electrode RE. As shown in FIG. 2, the reflective electrode RE is disposed on the transparent electrode TE and directly contacted with the transparent electrode TE, and the reflective electrode RE can extend into the contact hole CO. Each of the conductive layers 202, 206, and 209 may be a single metal layer including aluminum, copper, titanium, or tungsten, but not limited thereto. Each of the conductive layers 202, 206, and 209 may also be a composite metal layer including molybdenum/aluminum/molybdenum, titanium/aluminum/titanium, titanium/copper/titanium, titanium/copper, etc., but not limited thereto. The conductive layer 216 may include silver or other suitable reflective metal materials, but not limited thereto. The conductive layer 216 may include a single metal layer or a composite metal layer, but not limited thereto.

The display panel of the present invention is not limited to the aforementioned embodiment. The following description continues to detail other embodiments. To simplify the description and show the difference between other embodiments and the above-mentioned embodiment, identical components in each of the following embodiments are marked with identical symbols, and the identical features will not be redundantly described.

Figure 3:
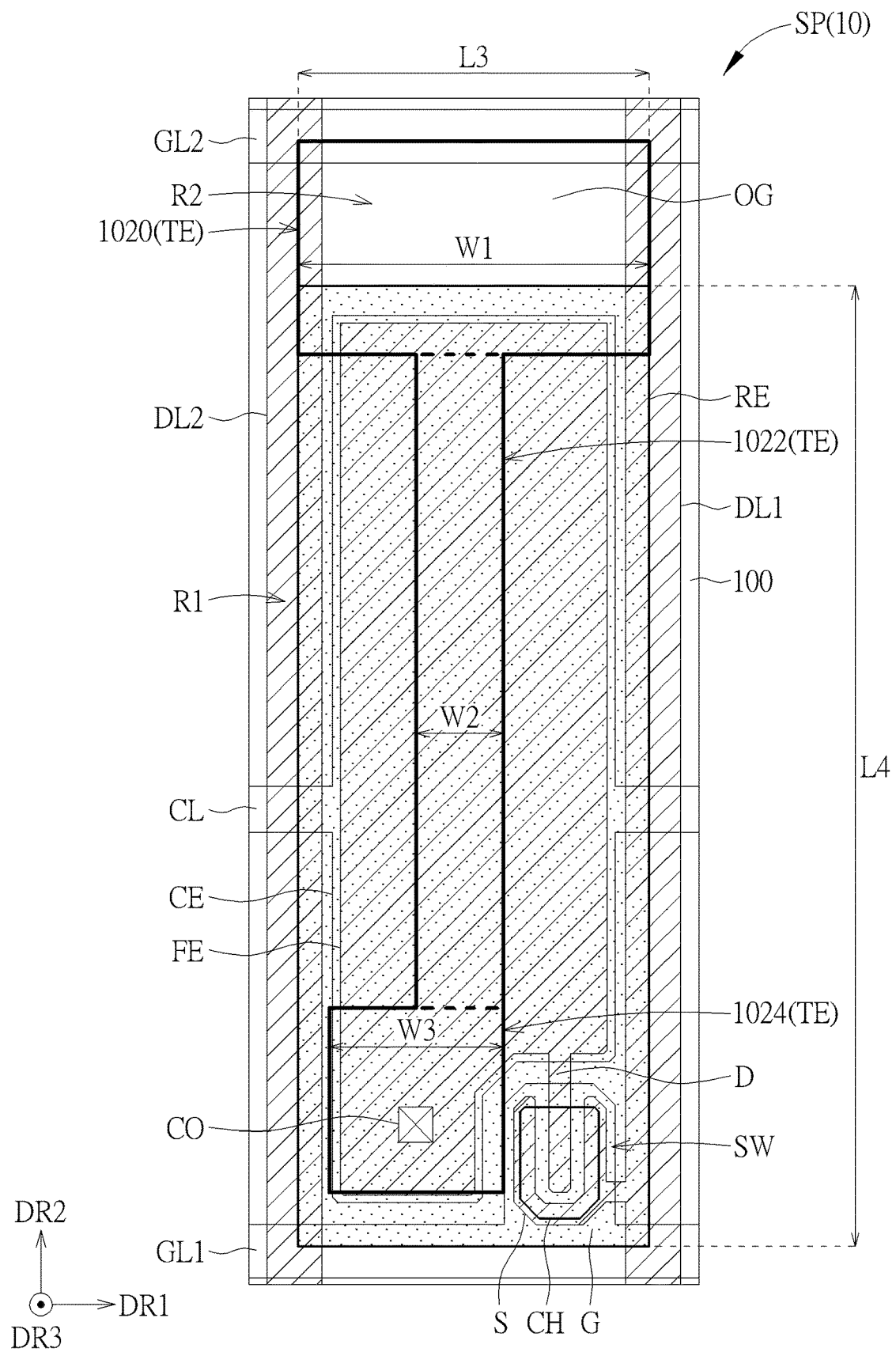
FIG. 3 is a schematic diagram illustrating a top view of a pixel structure in a display panel according to a second embodiment of the present invention.
Figure 4:
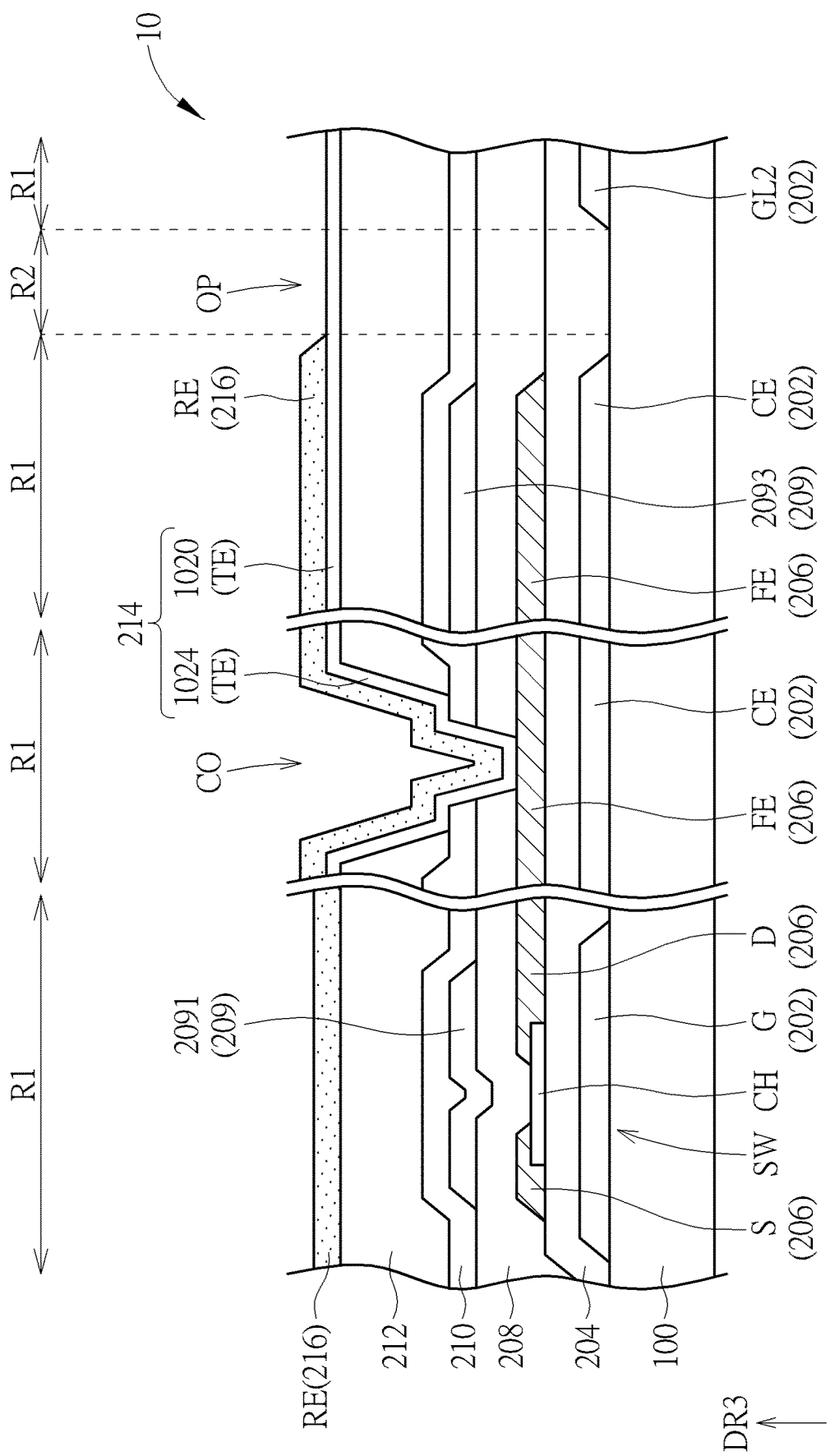
FIG. 4 is a schematic diagram illustrating a cross-sectional view of the display panel according to the second embodiment of the present invention.

Referring to FIG. 3 and FIG. 4, FIG. 3 is a schematic diagram illustrating a top view of a pixel structure in a display panel according to a second embodiment of the present invention, and FIG. 4 is a schematic diagram illustrating a cross-sectional view of the display panel according to the second embodiment of the present invention. The patterns of the transparent electrode TE and the reflective electrode RE in this embodiment are different from those in the first embodiment.

In this embodiment, the transparent electrode TE includes a portion 1020, a portion 1022, and a portion 1024. The portion 1022 is disposed between the portion 1020 and the portion 1024, one end of the portion 1022 is connected to the portion 1020, and the other end of the portion 1022 is connected to the portion 1024. A portion of the portion 1020 may be disposed in the light transmissive region R2, and another portion of the portion 1020 may be disposed in the reflective region R1. The portion 1024 may be electrically connected to the first electrode FE through the contact hole CO. The portion 1020 may have a width W1, the portion 1022 may have a width W2, and the portion 1024 may have a width W3. The width W1 may be greater than the width W3, and the width W3 may be greater than the width W2.

In this embodiment, the reflective electrode RE may not have the opening OP, and a length L4 of the long side of the reflective electrode RE may be less than the length L22 of the reflective electrode RE in the first embodiment. The reflective electrode RE only covers a portion of the portion 1020 of the transparent electrode TE, and the other portion of the portion 1020 of the transparent electrode TE is exposed.

The short side of the reflective electrode RE in this embodiment may have a length L3, the length L3 may be greater than the width W3 and the width W2 of the transparent electrode TE, and the length L3 of the reflective electrode RE may be approximately the same as the width W1 of the transparent electrode TE, but not limited thereto.

Since the length L3 of the reflective electrode RE can be greater than the widths W3 and W2 of the transparent electrode TE, the edges of the portions 1022 and 1024 of the transparent electrode TE can be covered by the reflective electrode RE. In addition, some edges of the portion 1020 of the transparent electrode TE can also be covered by the reflective electrode RE. Through the above design, the phenomenon that the silver from the reflective electrode RE remains at the edges of the transparent electrode TE can be reduced, and the image quality of the display panel 10 can be improved.

In addition, the display panel 10 of this embodiment can include an opening OG, and the light transmissive region R2 can be corresponded to the position of the opening OG. As shown in FIG. 3, the opening OG may be disposed between the reflective electrode RE and the scan line GL2 in the direction DR2 and between the data line DL1 and the data line DL2 in the direction DR1, but not limited thereto.

In summary, in the display panel of the present invention, the lengths or widths of the reflective electrode can be greater than the lengths or widths of the transparent electrode, and at least part of the edges of the transparent electrode can be covered by the reflective electrode. Therefore, the phenomenon that the silver of the reflective electrode remains at the edges of the transparent electrode can be reduced, and the image quality of the display panel can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising:
   a substrate; and
   a sub-pixel disposed on the substrate, wherein the sub-pixel comprises a reflective region and a light transmissive region, the light transmissive region is disposed in the reflective region, and the sub-pixel further comprises:
      a switch device disposed in the reflective region;
      a first electrode completely disposed in the reflective region and electrically connected to a drain of the switch device, wherein the first electrode is formed of a metal layer;
      a transparent electrode disposed on the first electrode and in the reflective region and the light transmissive region, wherein the transparent electrode is electrically connected to the first electrode, the transparent electrode has a first length in a first direction and a second length in a second direction, and the first direction and the second direction are different;
      a reflective electrode disposed on the transparent electrode and in the reflective region, wherein the reflective electrode is electrically connected to the transparent electrode, the reflective electrode has a third length in the first direction and a fourth length in the second direction, the third length is greater than the first length and the fourth length is greater than the second length; and
      an electrode disposed between the transparent electrode and the first electrode,
   wherein the reflective electrode comprises an opening, and the opening is corresponded to the light transmissive region of the sub-pixel.

2. The display panel according to claim 1, wherein the opening of the reflective electrode exposes a portion of the transparent electrode.

3. The display panel according to claim 1, wherein the reflective electrode is directly contacted with the transparent electrode.

4. The display panel according to claim 1, further comprising at least one insulating layer disposed between the first electrode and the transparent electrode, wherein a contact hole is disposed in the at least one insulating layer, and the transparent electrode is electrically connected to the first electrode through the contact hole.

5. The display panel according to claim 1, wherein an area of the reflective electrode is greater than an area of the transparent electrode.

6. The display panel according to claim 5, wherein the area of the transparent electrode is greater than an area of the first electrode.

7. The display panel according to claim 1, wherein the first electrode comprises a first side and a second side opposite to the first side, the switch device is disposed on the first side of the first electrode, and the light transmissive region of the sub-pixel is disposed on the second side of the first electrode.

8. The display panel according to claim 1, wherein the sub-pixel further comprises a second electrode, the second electrode is disposed between the first electrode and the substrate, and the second electrode is electrically connected to a common signal line.

9. The display panel according to claim 1, wherein a material of the reflective electrode comprises silver.

10. The display panel according to claim 1, wherein the transparent electrode comprises a transparent conductive material.

\* \* \* \* \*